United States Patent [19]

Morrow

[11] Patent Number: 5,036,734
[45] Date of Patent: Aug. 6, 1991

[54] CABLE STRIPPING TOOL
[75] Inventor: David L. Morrow, Chester, Conn.
[73] Assignee: Ben Hughes Communication Products Co., Chester, Conn.
[21] Appl. No.: 602,054
[22] Filed: Oct. 24, 1990

Related U.S. Application Data

[63] Continuation-in-part of Ser. No. 427,243, Oct. 25, 1989, abandoned.

[51] Int. Cl.⁵ .......................................... H02G 01/12
[52] U.S. Cl. ...................................... 81/9.44; 81/9.4; 30/90.1; 30/91.2
[58] Field of Search ................... 81/9.44, 9.4; 30/90.1, 30/91.1, 91.2, 90.6

[56] References Cited

U.S. PATENT DOCUMENTS

| | | | |
|---|---|---|---|
| 3,914,864 | 10/1975 | Prince | 30/90.6 |
| 4,051,749 | 10/1977 | Bell et al. | 81/9.51 |
| 4,070,930 | 1/1978 | Oprins | 30/90.6 |
| 4,130,031 | 12/1978 | Wiener et al. | 30/91.2 |
| 4,625,386 | 12/1986 | Bieganski | 30/90.1 |
| 4,730,391 | 3/1988 | Wood | 30/90.1 |
| 4,829,671 | 5/1989 | Cheng | 30/90.1 |

FOREIGN PATENT DOCUMENTS 2724714 12/1977 Fed. Rep. of Germany ......... 81/9.4

Primary Examiner—Frederick R. Schmidt
Assistant Examiner—Lawrence Cruz
Attorney, Agent, or Firm—McCormick, Paulding & Huber

[57] ABSTRACT

A coaxial cable stripping tool has a pair of opposing jaws which include a stripping jaw and a clamping jaw supported as associated ends of a pair of pivotally moveable operating handles. The stripping jaw has a pair of spaced apart cutting and stripping blades for cutting axially spaced portions of a cable to be stripped when the cable is gripped by the jaws and the tool is rotated about the axis of the cable. The jaws are normally spring biased to closed position and move to open position in response to operation of the handles. A clean-out member mounted on one of the handles sweeps through the space between the blades to dislodge scrap material trapped between the blades each time the handles are operated to open the jaws.

28 Claims, 3 Drawing Sheets

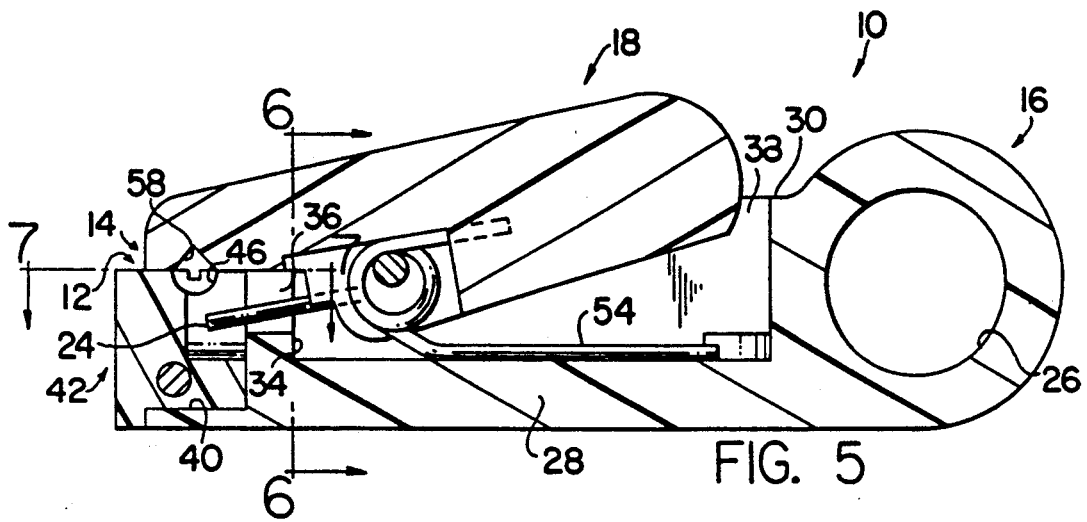
FIG. 5
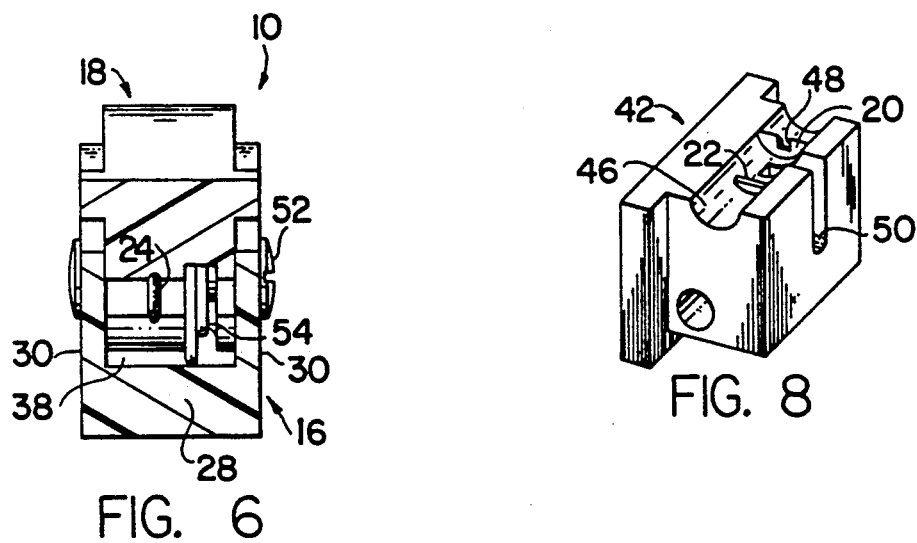
FIG. 6
FIG. 8
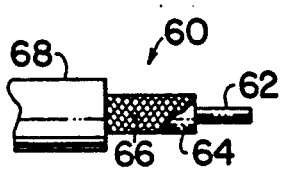
FIG. 9

CABLE STRIPPING TOOL

This is a continuation-in-part of co-pending application Ser. No. 427,243 filed on Oct. 25, 1989 now abandoned.

BACKGROUND OF THE INVENTION

This invention relates in general to cable stripping tools and deals more particularly with an improved tool having spaced apart cutting elements for both cutting and stripping axially spaced apart inner and outer layer of material from a coaxial cable or the like to expose a predetermined portion of a coaxial conductor contained within the cable.

Heretofore various cable stripping tools have been provided which include multiple cutters and which operate to sever the outer insulation jacket and successive coaxial inner layers of electrically insulating o electrically conducting materials at axially spaced apart locations along an end portion of a cable and to strip the severed materials from the cable to prepare the cable for termination. Typical stripping tools of the aforedescribed type are illustrated and described in the following listed United States Patents.

U.S. Pat. Nos. 3,914,864, 4,625,386, 4,070,930, 4,730,391, 4,130,031, 4,829,671.

In a tool of the type with which the present invention is concerned there is a tendency for the scrap material removed from a cable by the cutting and stripping operation to become lodged between the cutters. This scrap material must be removed from the tool to prepare the tool to perform the next cutting and stripping operation. Accordingly, it is the general aim of the present invention to provide an improved cable stripping tool wherein scrap material produced by the cutting and stripping operation is automatically cleared from the tool during the course of normal tool operation.

SUMMARY OF THE INVENTION

In accordance with the present invention an improved conductor stripping tool comprises a pair of jaws which include a stripping jaw and a clamping jaw and means supporting the jaws for pivotal movement between open and closed positions. A pair of spaced apart cutting and stripping elements are mounted on the stripping jaw for cutting and stripping successive coaxial layers of cable material at axially spaced apart locations along an associated cable position between the jaws when the jaws are in closed position. A clean-out means is provided for removing scrap material lodged between the cutting and stripping elements and including a rigid member supported on said jaw moving means for movement along an arcuate path through the space between the cutting and stripping elements in response to opening of the jaws.

BRIEF DESCRIPTION OF THE DRAWING

FIG. 5 is a sectional view taken generally along the line 5—5 of FIG. 2.

FIG. 6 is a sectional view taken along the line 6—6 of FIG. 5.

FIG. 8 is a somewhat enlarged perspective view of the stripping jaw cartridge.

FIG. 9 is a fragmentary side elevation view of a typical cable shown after it has been stripped by the cable stripping tool of the present invention.

DETAILED DESCRIPTION OF PREFERRED EMBODIMENT

Figure 1:
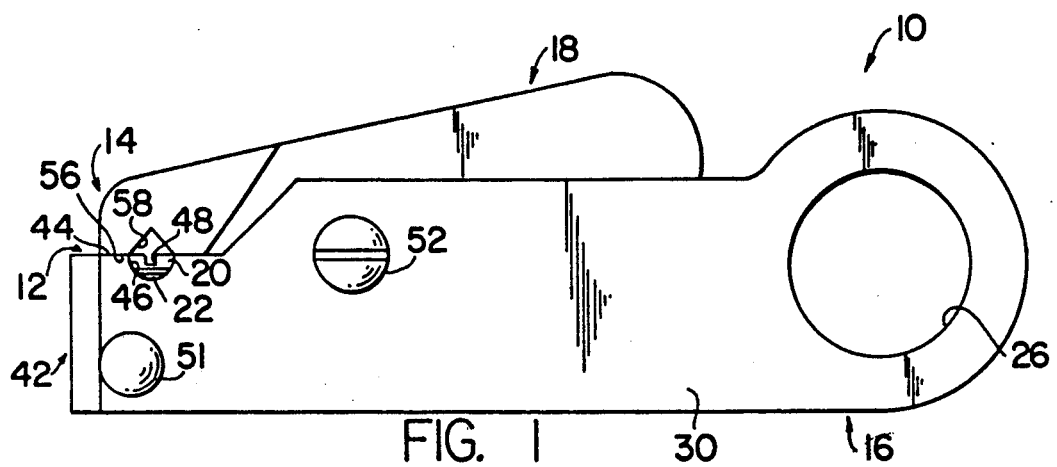
FIG. 1 is a side elevational view of a cable stripping tool embodying the present invention shown with the jaws thereof in closed position.
Figure 2:
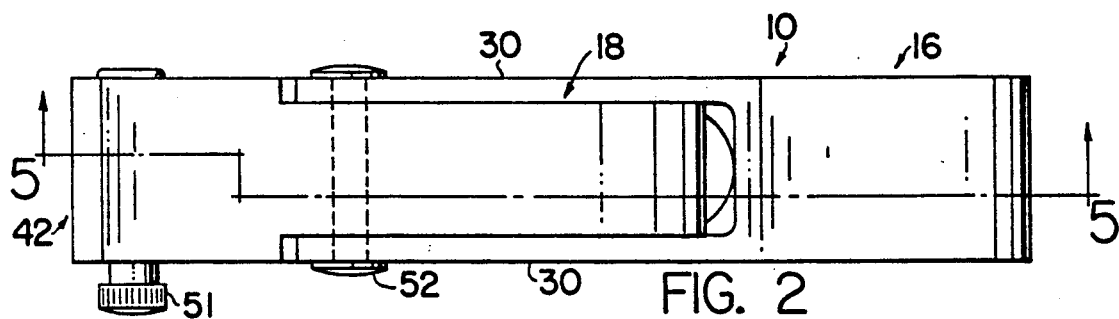
FIG. 2 is a plan view of the cable stripping tool of FIG. 1.

Turning now to the drawing, a cable stripping tool embodying the present invention and indicated generally by the reference numeral 10 is adapted for stripping an end portion of a cable to prepare the cable for termination. More specifically, the tool 10 is particularly adapted to remove a portion of the outer insulation jacket from a coaxial cable in axially spaced relation to a free end of the cable and to simultaneously remove one or more inner layers of material from the cable to expose the terminal end of a coaxial conductor contained within the cable. An end portion of a typical coaxial cable is shown in FIG. 9 as it appears after having been stripped using a tool embodying the present invention.

The illustrated tool 10 essentially comprises a pair of opposing jaws which include a stripping jaw and a clamping jaw respectively generally indicated at 12 and 14. A pair of levers or handle members indicated generally at 16 and 18 support the jaws for movement between open and close positions relative to each other. A pair of spaced apart cutting and stripping elements or blades 20 and 22 are mounted in the stripping jaw 12 for cutting the insulation jacket and one or more layers of material contained within the jacket of a cable to be stripped when the cable is positioned between the closed jaws 12 and 14. The tool 10 further includes a clean-out member indicated generally at 24 for removing material lodged between the cutting elements in response to opening of the jaws 12 and 14, all of which will be hereinafter more fully discussed.

In the somewhat more detailed description that follows the cable stripping tool 10 is described as shown oriented in the drawing, the handle members or handles 16 and 18 being designated, respectively, as lower and upper handles. However, it should be understood that the tool may be operated in any convenient orientation.

Figure 3:
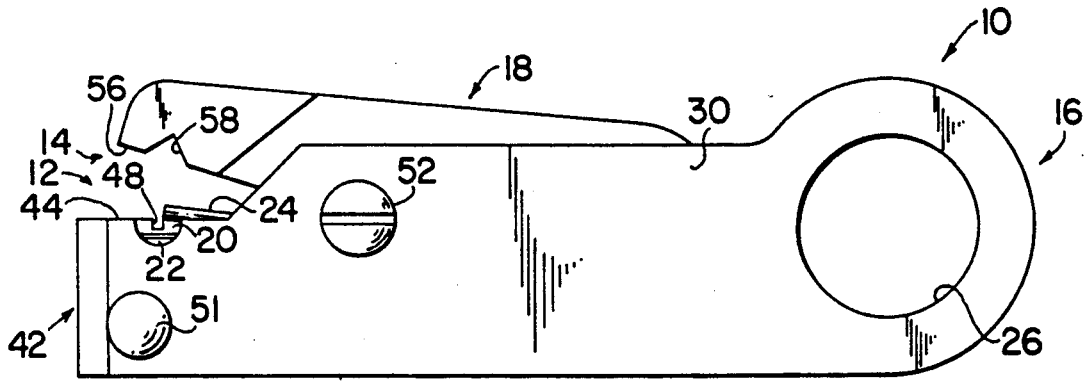
FIG. 3 is similar to FIG. 1 but shows the jaws in open position.
Figure 4:
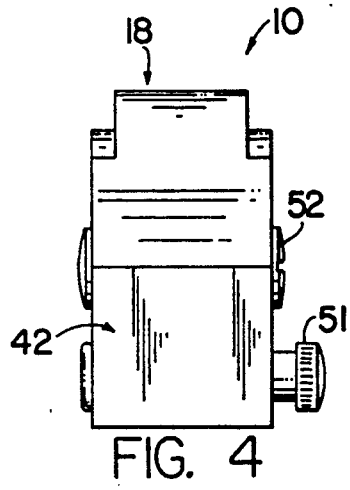
FIG. 4 is a front elevational view of the cable stripping tool.
Figure 7:
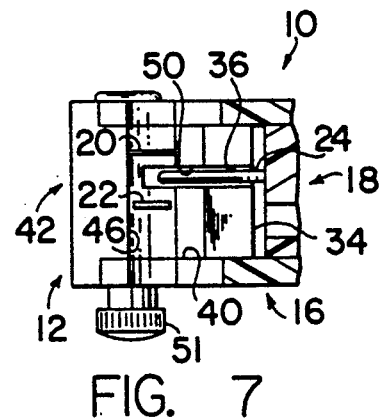
FIG. 7 is a sectional view taken along the line 7—7 of FIG. 5.

The handles may be made from any suitable material and may take various forms, but preferably the handles 16 and 18 are constructed of durable resilient dielectric plastic material and have a generally rectangular cross-section. The lower handle 16 includes a rear portion which has a generally cylindrical finger opening 26 extending transversely through it. A bottom wall 28 and a pair of opposing sidewalls 30,30 integrally connected to the rear portion extend forwardly from it and terminate in a common plane at the forward end of the handle 16. The forward end portions of the sidewalls 30,30 are downwardly offset from the rear portions thereof as best shown in FIGS. 1 and 3. Additional structural support for the front part of the handle 16 is provided by a partition wall 34 which extends upwardly from the bottom wall 28 and connects the sidewalls 30,30 in rearwardly spaced relation to the forward end of the handle 12, as best shown in FIG. 5. A vertically disposed and upwardly open slot 36 is formed in the partition wall 34 for a purpose which will be hereinafter evident.

The partition wall 34 cooperates with the handle rear portion and with portions of the bottom and sidewalls 28 and 30,30 to define an upwardly open cavity 38. The partition wall also cooperates with portions of the bottom and sidewalls at the forward end of the handle to define a forwardly and upwardly open recess 40.

The stripping jaw 12 may form an integral part of one of the handles. However, in accordance with the present preferred construction, the stripping jaw is partially defined by a replaceable jaw cartridge, indicated generally a 42, which is received and releasably retained within the recess 40. The jaw cartridge 42, best shown in FIG. 8, preferably comprises a generally rectangular block of dielectric plastic material and has outwardly directed flanges at its front end extending along its bottom and side edges for engaging the forwardly facing surfaces of the bottom and sidewalls 28 and 30,30 when the jaw cartridge 42 is assembled with the handle 12 within the recess 40. In assembly, the upper surface of the jaw cartridge 42 cooperates with the upper surfaces of the sidewalls 30,30 at the forward end of the handle to define an upwardly facing abutment surface 44. A generally semi-cylindrical cable receiving channel 46 is defined by the jaw cartridge and associated forward end portions of the sidewalls 30,30 and opens upwardly through the abutment surface 44. The cable receiving channel 46 has a radius substantially equal to the radius of an associated cable to be stripped.

The cutting and stripping blades 20 and 22 are mounted in fixed position on the jaw cartridge 42 within the cable receiving channel 46 and are preferably formed from flat metal, imbedded within the jaw cartridge 42. The blades have edge portions exposed within the cable receiving channel and extend across the channel. More specifically, the blades 20 and 22 are disposed in radial planes and are axially spaced apart relative to each other along the axis of the semi-cylindrical cable receiving channel 46. The cutting edge of the blade 20 is preferably disposed within the plane of the abutment surface 44 and has an central notch 48 opening upwardly through it for receiving a conductor of an associated coaxial cable to be stripped. The cutting edge of the blade 22 is preferably parallel to the cutting edge of the blade 20 but spaced downwardly from it. The cutting edge of the blade 22 is spaced above the bottom of the channel 46 a distance substantially equal to the thickness of an outer insulation jacket on a cable to be stripped. A vertically disposed rearwardly and upwardly opening central notch 50 is formed in the blade cartridge 42 for registry with the slot 36 and opens through the cable receiving channel 46 between the blades 20 and 22. The replaceable jaw cartridge 42 is releasably retained in assembly with the lower handle 16 by a threaded fastener 51 which extends transversely through the sidewalls 30,30 and through the blade cartridge 42, substantially as shown.

The upper handle 18 is of somewhat shorter length than the lower handle 16 and is partially received within and substantial complements an associated portion of the cavity 38. The upper handle 18 is pivotally connected to the lower handle 16 intermediate its ends by a threaded fastener 52 which extends through the upper handle 18 and through the sidewalls 30,30 intermediate the end of the lower handle 16. A torsion spring 54 received within an associated slot in the upper handle 18 and coiled about the pivot fastener 52 acts between the upper handle 18 and the bottom wall 28 to bias the upper handle 18 in counterclockwise direction about the axis of the fastener 52 and toward its closed jaw position, as it appears in FIGS. 1 and 5 of the drawings.

A downwardly facing abutment surface 56 at the forward end of the upper handle 18 engages the upwardly facing abutment surface 44 on the lower handle jaw 16 when the jaws of the tool 10 are in closed position. The upper or clamping jaw 14 is defined by a groove 58 formed in the forward end portion of the upper handle 18. Preferably, and as shown the latter groove has an inverted generally V-shape cross-section and extends transversely through the handle 18 in generally axially parallel relation to the cable receiving channel 46.

In one presently preferred form, the clean-out member 24 comprises an elongated rigid rod mounted in fixed cantilever position on the upper handle 18. The rod 24 extends forwardly of the handle through the slot 36 and into the notch 50 when the jaws are in closed position. Operation of the handles 16 and 18 to move the jaws to open position causes the clean-out rod 24 to sweep upwardly through the cable receiving channel, within the space between the blades 20 and 22. In FIG. 9 there is shown an end portion of a typical coaxial cable, indicated generally at 60, which has been stripped using a stripping tool such as the tool 10. The illustrated cable 60 has a metallic central conductor 62 coaxially surrounded by an inner layer of electrical insulating material 64. A layer of braided wire 66 coaxially surrounds the inner insulation layer 64 and the conductor 62, substantially as shown. An outer layer of electrical insulating material 68 coaxially surrounds the braided metallic layer 66.

An end portion of a cable to be stripped, such as the cable 60, is inserted into the tool 10 below and in general axially alignment with the clamping groove 58 and above the clean-out member 24. The cable may, if desired, be positioned with its free end disposed in the plane of an associated sidewall 30 to gauge the length of conductor 62 to be exposed. The jaws are then allowed to close on the cable in response to closing force exerted by the spring 54. The clamping jaw forces the cable downwardly against the blades 20 and 22 and toward seating engagement within the cable receiving channel 46. If necessary, squeezing pressure may be manually applied to the forward ends of the jaws to fully close the jaws and cause the cutters 20 and 22 to cut into the cable 60. When the cable end portion is fully seated within the cable receiving channel 46 the tool 10 is rotated about the axis of the cable 60, using the finger receiving recess 26 at the rear end of the lower handle, to form annular cuts in the cable.

Upon completion of the cutting operating the tool is drawn away from the cable in an axial direction with the jaws in closed position to strip the cut insulation from the end portion of the cable, thereby exposing the terminal end portion of the conductor 62 and portions of the insulating layer 64 and the conductive layer 66 leaving the cable end portion in a condition in which it appears in FIG. 9.

At least some of the jacket material removed from the cable will remain within the closed jaws 12 and 14 after the cable has been stripped.

When the jaws of the tool 10 are opened in preparation for the next cable stripping operation the material removed from the cable and disposed within the jaws laterally outward of the blade 20 will usually fall freely from the tool. Any scrap material lodged between the blades 20 and 22 will be removed therefrom by the clean-out rod 24 which sweeps along an arcuate path from a position below the blades 20 and 22 through the space between the blades and to a position above the blades when the jaws are opened by operating the handles 16 and 18.

In FIGS. 10-14 another cable stripping tool embodying the present invention is indicated generally by the reference numeral 10a. The tool 10a is similar in many respects to the previously described tool 10 and parts of the cable stripping tool 10a which correspond to parts of the previously described tool 10 bear the same reference numeral and a letter "a" suffix. More specifically, the illustrated tool 10a includes a pair of levers or handles designated generally at 16a and 18a which support a pair of opposing jaws, indicated generally at 12a and 14a, for pivotal movement relative to each other between open and closed positions.

Figure 12:
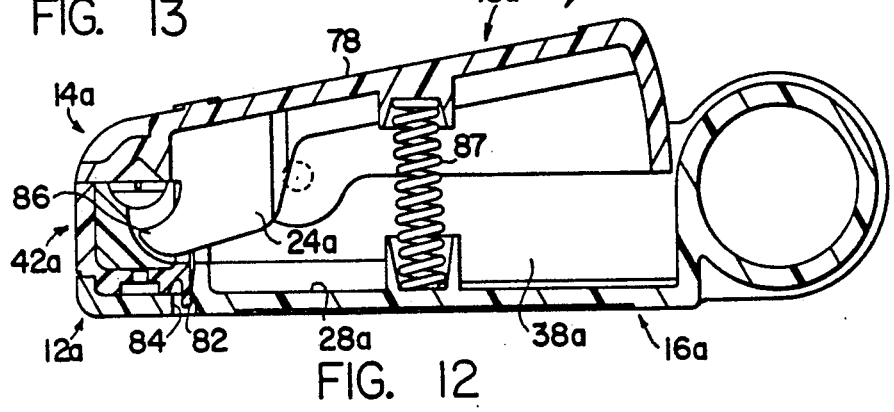
FIG. 12 is a sectional view taken generally along the line 12—12 of FIG. 11.

The handles are preferably molded from durable resilient lightweight dielectric plastic material. The lower handle 16a comprises a unitary structure and has a bottom wall 28a and a pair of opposing transversely spaced apart sidewalls 30a, 30a which extend upwardly from the bottom wall 28a. A transversely disposed partition wall 34a extends upwardly from the bottom wall 28a and connects the sidewalls 30a,30a in rearwardly spaced relation to the front end of the lower handle 16a, as best shown in FIG. 12. As in the previously described embodiment, the partition wall 34a is slotted at 36a.

Figures 13, 14:
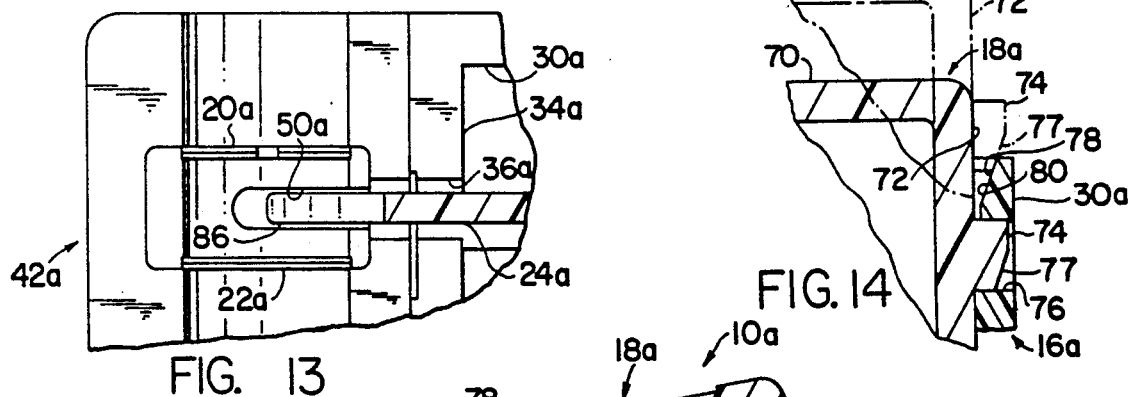
FIG. 13 is a somewhat enlarged fragmentary sectional view taken along the line 13—13 of FIG. 10.
FIG. 14 is a somewhat enlarged fragmentary sectional view taken along the line 14—14 of FIG. 10.

The upper handle 18a has a top wall 70 and a pair of opposing transversely spaced apart sidewalls 72,72 (one shown in FIG. 14). The upper handle 18a is partially received within and substantially complements an associated portion of a cavity 38a defined by the lower handle. Integral trunnions 74,74 project outwardly from the sidewalls 72,72 and are received within coaxial transversely aligned apertures 76,76 formed in the sidewalls 30a,30a. Each trunnion has a generally downwardly and inwardly inclined cam surface 77 at its outer end, for a purpose which will be hereinafter evident. The trunnions support the upper handle 18a for pivotal movement on and relative to the lower handle 16a.

When the upper handle is assembled with the lower handle each trunnion 74 is first inserted into an inwardly and upwardly open slot 78 in an associated sidewall 30a. Each slot 78 communicates with an associated aperture 76 and is partially defined by an inwardly facing and downwardly and inwardly inclined cam surface 80, as best shown in FIG. 14. The co-engageable cam surfaces 77,77 and 80,80 on the trunnions and the sidewalls 30a,30a cause the resilient sidewalls of the upper and lower handles to yield in transverse directions, as necessary to facilitate snap together assembly of the handles with the trunnions 74,74 disposed within the apertures 76,76, as best shown in FIG. 14, wherein a condition of partial assembly of the upper handle 18a with the lower handle 16a is indicated by broken lines.

As in the previously described embodiment, the lower or stripping jaw 12a is defined by a jaw cartridge releasably retained in a recess in the forward end of the lower handle 16a. The jaw cartridge 42a has an integral depending latch member 82 which is received in snap engagement with the lower handle 16a within a recess 84 formed in the lower handle. The latch tab 82 releasably retains the stripping jaw cartridge 42a in assembly with the lower handle and facilitates rapid jaw cartridge removal and replacement. The cartridge 42a has a pair of spaced apart blades 20a and 22a arranged in a manner substantially identical to the manner in which the previously described blades 20 and 22 are arranged. A slot 50a formed in the cartridge opens upwardly between the blades 20a and 22a and communicates with the slot 36a when the cartridge is assembled within the lower handle 16a.

The clamping jaw 14a comprises an integral part of the upper handle 18a and is defined by a groove 58a formed in the forward end of the upper handle 18a, substantially as shown. A clean out member 24a integrally connected to and depending from the upper handle member 18a has a projecting free end portion 86 which moves within the slots 36a and 50a and sweeps through the space between the blades 20a and 22a to remove scrap material which may be lodged between the blades as the jaws 12a and 14a are opened by operation of the handles.

Figure 10:
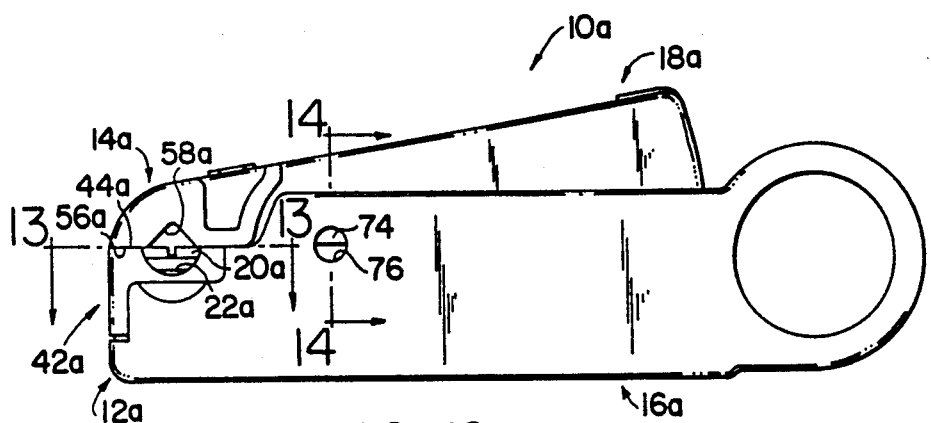
FIG. 10 is a side elevational view of another cable stripping tool embodying the present invention.
Figure 11:
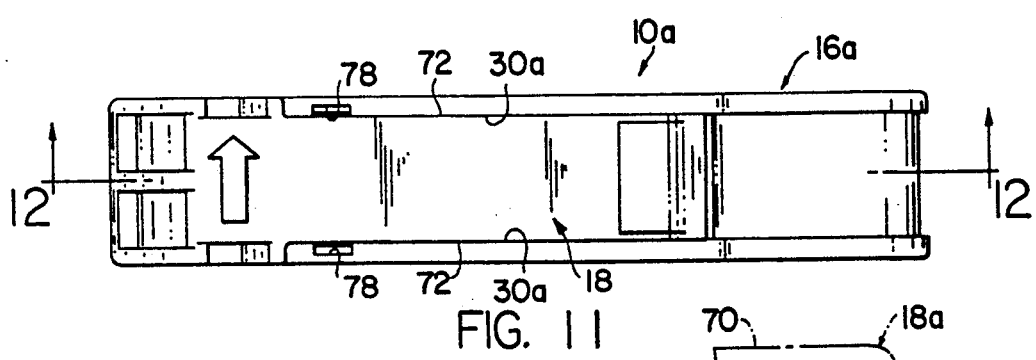
FIG. 11 is a plan view of the cable stripping tool of FIG. 10.

A coil spring 87 acts between the upper and lower handles rearwardly of the trunnions 74,74, as shown in FIG. 12, to bias the jaws 12a and 14a toward closed position, the latter position being shown in FIGS. 10 and 12.

The operation of the tool 10a is substantially identical to the operation of the tool 10 previously described.

I claim:

1. Cable stripping tool for simultaneously removing a plurality of layers of material from the end portion of a cable and comprising a pair of opposing jaws including a clamping jaw and a stripping jaw, said stripping jaw having a pair of spaced apart cutting and stripping elements mounted in fixed position thereon, jaw moving means for pivotally moving said jaws between open and closed positions relative to each other, and clean-out means for dislodging material removed from an associated cable and lodged between said cutting and stripping elements in response to movement of said jaws to said open position and including a rigid member supported in fixed position on said jaw moving means and moveable along an arcuate path through the space between said cutting and stripping elements from a position below said cutting and stripping elements to a position above said cutting and stripping elements in response to movement of said jaws to said open position.

2. Cable stripping tool as set forth in claim 1 wherein said jaw moving means comprises a pair of levers and said stripping jaw is carried by one of said levers and said clean-out means is associated with the other of said levers.

3. Cable stripping tool as set forth in claim 1 wherein said stripping jaw comprises a removable jaw cartridge carrying said cutting and stripping elements and said tool includes means for releasably retaining said jaw cartridge on said jaw moving means.

4. Cable stripping tool as set forth in claim 1 wherein said tool includes means for biasing said jaws toward and into said closed position.

5. Cable stripping tool comprising a pair of elongated operating handles, means connecting said operating handles intermediate the ends thereof for pivotal movement relative to each other, a pair of opposing jaws including a stripping jaw at the forward end of one of said operating handles and a clamping jaw at the forward end of the other of said operating handles, said jaws being moveable between open and closed positions, a pair of spaced apart cutting and stripping elements mounted in said stripping jaw for engaging and cutting axially spaced apart portions of the material on a cable positioned between said jaws when said jaws are in said closed position, and clean-out means including a clean-out member mounted on said other of said operating handles for removing scrap material lodged between said stripping blades in response to operation of said operating handles to move said jaws from said closed position to said open position.

6. A conductor stripping tool as set forth in claim 5 wherein said member comprises a rod.

7. Cable stripping tool as set forth in claim 5 wherein said clean-out member comprises an elongated rigid rod supported in cantilever position on said other of said operating handles and moveable through the space between said cutting and stripping elements in response to movement of said jaws to said open position.

8. Cable stripping tool as set forth in claim 5 wherein said cutting and stripping elements comprise a pair of flat blades mounted in fixed parallel relation to each other.

9. Cable insolation stripping tool as set forth in claim 8 wherein said one of said operating handles has a forwardly open recess at the forward end thereof and said stripping jaw is defined by a jaw cartridge received within said recess and releasably secured to said one of said handles.

10. A conductor stripping tool as set forth in claim 9 wherein said stripping jaw has a slot therein communication with the space between said blades and said clean-out member comprises an elongated rigid rod extending into said slot when said jaws are in closed position, said rod being moveable through said space between said blades in response to operation of said handles.

11. Coaxial cable stripping tool for removing a plurality of coaxial layers of material from an end portion of an associated coaxial cable comprising a pair of opposing jaws, including a clamping jaw and a stripping jaw, said stripping jaw including a pair of spaced apart blades, a pair of elongated handle members including an upper handle member and a lower handle member respectively supporting said jaws for movement between open and closed positions, said stripping jaw being located at the forward end of said lower handle member, said clamping jaw being located at the forward end of said upper handle member, means connected said handle members for pivotal movement about a transverse axis relative to each other, said lower handle member having a rear part defining a finger receiving opening and having a bottom wall and a pair of opposing sidewalls integrally connected to said rear part and extending forwardly therefrom, said lower handle member defining a cavity intermediate said axis and said rear end receiving an associated complimentary portion of the upper handle member therein, biasing means associated with said handle members for urging said jaws toward and into said closed position, and clean-out means for removing scrap material lodged between said blades in response to movement of said jaws to said open position and including a rigid rod mounted in fixed cantilever position on said upper handle member.

12. Coaxial cable stripping tool as set forth in claim 11 wherein said lower handle member has a forwardly and upwardly open recess at the forward end thereof partially defined by said bottom wall and associated portions of said sidewalls and said stripping jaw comprises a jaw cartridge received and releasably retained in said recess.

13. Coaxial cable stripping tool as set forth in claim 12 wherein said jaw cartridge and associated portions of said side walls define an upwardly facing abutment surface and generally a semi-cylindrical cable receiving channel and said blades are mounted in fixed position within said jaw cartridge and extend across said channel in parallel relation to each other.

14. Coaxial cable stripping tool as set forth in claim 13 wherein said semi-cylindrical channel has a radius substantially equal to the radius of an associated cable to be stripped by said tool.

15. Coaxial cable stripping tool as set forth in claim 13 wherein one of said blades has an upper edge disposed generally within the plane of said abutment and the other of said blades has an upper edge disposed below the upper edge of said one blade.

16. Coaxial cable stripping tool as set forth in claim 15 wherein said one blade has a central notch therein opening upwardly through the upper edge thereof.

17. Cable stripping tool as set forth in claim 6 wherein said clean out member comprises an integral part of said other of said operating handles.

18. Cable stripping tool as set forth in claim 17 wherein said clean out member depends from said other of said operating handles and has a projecting free end portion for sweeping between said cutting and stripping elements when said jaws are opened by operation of said handles.

19. Cable stripping tool as set forth in claim 5 wherein said means connecting said operating handles comprises a pair of trunnions projection from one of said operating handles and received within apertures in the other of said operating handles.

20. Cable stripping tool as set forth in claim 19 wherein said trunnions comprise integral portions of one of said operating handles.

21. Cable stripping tool as set forth in claim 5 including means for assembling said operating handles in snap together connected relation to each other.

22. Cable stripping tool as set forth in claim 21 wherein said means for assembling said operating handles comprises co-engagable cam surfaces on said operating handles.

23. Cable stripping tool as set forth in claim 22 wherein one of said operating handles has trunnions thereon and the other of said operating members includes sidewalls having apertures receiving said trunnions therein and said co-engagable cam surfaces are defined by said trunnions and said sidewalls.

24. Cable stripping tool as set forth in claim 5 including a jaw cartridge defining said stripping jaw and means for releasably retaining said jaw cartridge in snaptogether assembly with said one operating handle.

25. Cable stripping tool as set forth in claim 24 wherein said means for releasably retaining said jaw cartridge comprises a resilient latch member carried by said jaw cartridge and engageable with said one handle member with a recess in said one handle member.

26. Cable stripping tool as set forth in claim 5 including means for biasing said jaws toward closed position.

27. Cable stripping tool as set forth in claim 26 wherein said biasing means comprises a coil spring acting between said operating handles.

28. Coaxial cable stripping tool for removing a plurality of coaxial layers of material from an end portion of an associated coaxial cable comprising a pair of opposing jaw including a clamping jaw and a stripping jaw, said stripping jaw having a pair of spaced apart blades, a pair of elongated handle members including an upper handle member and a lower handle member respectively supporting said jaws for movement between open and closed positions, said stripping jaw being located at the forward end of said lower handle member, said clamping jaw being located at the forward end of said upper handle member, means connected said handle members for pivotal movement about a transverse axis and relative to each other and including trunnions carried by one of said handle members and received within apertures defined by the other of said handle members, said lower handle member having a rear portion defining a finger receiving opening and having a bottom wall and a pair of opposing sidewalls integrally connected to said rear portion and extending forwardly therefrom, said lower handle member defining a cavity receiving an associated complimentary portion of said upper handle member therein, biasing means acting between said handle members for urging said jaws toward closed position, and clean-out means for removing scrap material lodged between said blades and including a rigid member integrally connected to and depending from said upper handle member and having a projecting free end portion for sweeping through the space between said blades to dislodge scrap material lodged therebetween in response to operation of said handle members to move said jaws to open position.

* * * * *